Patented Nov. 5, 1929

1,734,634

UNITED STATES PATENT OFFICE

HENRY B. MORSE, OF DANVERS, MASSACHUSETTS, ASSIGNOR, BY MESNE ASSIGNMENTS, TO ALBERT C. BURRAGE, JR., OF IPSWICH, MASSACHUSETTS

METHOD OF VULCANIZING RUBBER AND RESULTING PRODUCTS

No Drawing.   Application filed June 4, 1929.   Serial No. 368,427.

This invention relates to the art of treating rubber or rubber compounds, and has for an object the provision of an improved procedure for the vulcanization of the same in the presence of an accelerator and of compounds or compositions with which to effect the purpose of the invention.

In the art of rubber manufacture, it has long been known that the vulcanizing process may be accelerated by the addition of various compounds in relatively small amounts. The compounds which have been found to thus accelerate vulcanization, known as accelerators, have been constantly added to by research and now include numerous types of substances, both inorganic and organic. Of these substances, the organic compounds are preeminently the more satisfactory and present a wide range of accelerating activity. Those selected for practical use, however, are generally restricted to compounds which may be mixed with the rubber or rubber compound without inducing appreciable vulcanizing effect at atmospheric temperature or during milling operations, but which actively accelerate the reaction in the customary vulcanizing treatment. Other accelerator compounds, frequently termed "ultra accelerators" or "semi-ultra accelerators", initiate the vulcanizing reaction sometimes prematurely, either in the cold only or during the mixing operation, resulting in "scorching" which hinders or entirely prohibits the further use of the rubber or rubber compound. Consequently, such compounds ordinarily have not been used in the manufacture of rubber products, even though they would greatly reduce the time required for vulcanization and may be otherwise suitable for use in rubber compositions.

By the present invention it is found that the accelerating action of accelerator compounds generally in rubber compositions, may be inhibited (at ordinary and slightly elevated temperatures and during the mixing and milling operations) or retarded by the addition of organic compounds of a certain type hereinafter defined, and that thereafter the vulcanizing reaction,—effectively accelerated by the accelerator,—may be caused to proceed at will by subjecting the rubber composition to be vulcanized to vulcanizing conditions.

It is thought that the accelerator and the inhibitor react or combine to form a reaction product or compound which does not promote the vulcanizing reaction of the vulcanizable composition (under the preliminary conditions such as mixing and milling) but which, under the vulcanizing conditions such as increased temperature, dissociates and liberates the accelerator which then acts in its accelerating capacity, and the inhibitor may remain inert or may itself act as an accelerator.

In other words, the critical temperature of the accelerator, with respect to its initiating prematurely the vulcanizing reaction in the rubber, is apparently raised to a point above the temperatures of milling or compounding and within the range of the vulcanizing treatment.

The compounds manifesting such inhibiting action upon premature initiation of vulcanization by accelerators (and more especially the "ultra accelerators" and those sometimes referred to as "semiultra accelerators" —among which may be mentioned the thiazoles, represented by mercapto benzo thiazole, certain disulphides such as tetra methyl thiuram disulphide, certain monosulphides such as tetra methyl thiuram monosulphide, etc., and their derivatives) are found to typically include the nitroso-amines which may be represented by the empirical formula:—

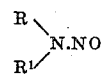

in which R and R' represent alkyl or aryl radicals (or nuclei) which may be alike or unlike and in turn may contain or be associated with one or more substituents.

In a representative example of the invention, rubber and the usual vulcanizing and filler materials, together with the desired amounts of the accelerator compound and inhibiting compound, may be compounded and mixed in the usual manner as by milling (without premature vulcanization or scorching), and subsequently molded and vulcanized to the required degree of cure, by heating to the usual range of vulcanization temperatures. The rate of vulcanization and degree of cure obtained may be accurately controlled by the time and temperature of vulcanization, to provide a final cure equal to or better than that obtained without the use of the preliminary inhibiting compound or "prehibitor."

In a preliminary "scorching" test, for example, in which the compounds were subjected to especially high temperatures during the mixing and milling operations until scorching was effected, a rubber composition containing:

100    parts rubber (smoked sheet)
    3½    parts sulphur
    5    parts ZnO
    ½    part mercapto benzo thiazole to which .43 part dibeta naphthyl nitroso-amine was added, was thoroughly milled and mixed on the mixing rolls; the mix was then removed and again milled on rolls, purposely heated by steam so as to maintain a temperature in the stock of approximately 95° to 100° C.,—for 110 minutes before scorching occurred.

A corresponding stock without the addition of dibeta naphthyl nitroso-amine, upon being milled and mixed, and again milled under like conditions of temperature, scorched in 65 minutes.

A similar test carried out upon a rubber compound of the formula:

100    parts rubber (smoked sheet)
    3    parts sulphur
    5    parts ZnO
    .15    part tetra methyl thiuram disulphide
    .75    part dibeta naphthyl nitroso-amine produced scorching in about 72 minutes. Under like conditions the same compound, without the dibeta naphthyl nitroso-amine, was scorched in twenty minutes.

A third compound, having the formula:

100    parts rubber (smoked sheet)
    3    parts sulphur
    5    parts ZnO
    .15    part tetra methyl thiuram monosulphide
    .75    part dibeta naphthyl nitroso-amine was treated in the same way as the preceding compounds and scorching took place in 118 minutes, while the same compound, without dibeta naphthyl nitroso-amine, was scorched in about 65 minutes, under the same conditions.

This test, developed for the purpose, serves to measure the degree of the retarding or inhibiting effect of the inhibiting compound upon the vulcanization reaction and the accelerating influence of the ultra accelerator at temperatures of about 100° C. or less, as contrasted with vulcanizing temperatures which as ordinarily employed are above 120° C.

Similar tests were carried out employing the same composition, but with a different lot of smoked sheet rubber which tended to scorch slower (without the addition of prehibitor) than the rubber employed above. The results obtained are given below:

TABLE I

*Stock*

| | |
|---|---|
| Rubber | 100 |
| Sulphur | 3 |
| Zinc oxide | 5 |
| Tetramethyl thiuram disulfide | 0.15 |

| | Minutes before scorching |
|---|---|
| Stock without prehibitor | 44 |
| With addition of 0.75 part of:— | |
|   Diphenyl nitroso-amine | 110 |
|   Dialpha naphthylnitroso-amine | 62 |
|   Phenyl beta naphthylnitroso-amine | 93 |
|   Phenyl alpha naphthylnitroso-amine | 93 |
|   Di-orthotolyl nitroso-amine | 97 |
|   Phenyl orthotolyl nitroso-amine | 102 |
|   Phenyl paratolyl nitroso-amine | 102 |
|   Benzyl phenyl nitroso-amine | 52 |
|   Methyl phenyl nitroso-amine | 57 |
|   Diethyl nitroso-amine | 55 |
|   Piperidine nitroso-amine | 55 |
|   Carbazol nitroso-amine | 46 |

In a typical application of the invention to the usual vulcanizing procedure, rubber compounds were prepared as follows:

I 100    parts rubber
    40.5    parts carbon black
    5.0    parts ZnO
    3.0    parts sulphur
    5.0    parts mineral rubber
    3.0    parts stearic acid
    .8    part mercapto benzo thiazole

II

Same as Formula I with addition of 1.0 part diphenyl nitroso-amine.

III

Same as Formula I with addition of .75 part diphenyl nitroso-amine.

IV

Same as Formula I with addition of .50 part diphenyl nitroso-amine.

These were mixed by milling in the usual manner, care being taken, especially with the compound of Formula I, to prevent preliminary vulcanization or scorching. The mixed compounds were then laid in thin sheets in a vulcanizing mold and vulcanized at 20 pounds steam pressure. Samples of each compound were vulcanized, for periods of 30, 45 and 60 minutes, respectively. One portion of each sample was then subjected to a tensile strength test, the results being given in the following table:

TABLE II

*Cure at twenty pounds steam pressure*

30 Minutes

|  |  | 300% | 500% | Final tensile lbs. per sq. in. | Final elongation in per cent |
|---|---|---|---|---|---|
| I | A | 735 | 1965 | 3460 | 685 |
| II | A | 380 | 1140 | 2120 | 675 |
| III | A | 583 | 1675 | 2930 | 680 |
| IV | A | 637 | 1820 | 3100 | 665 |

45 Minutes

|  |  | 300% | 500% | Final tensile lbs. per sq. in. | Final elongation in per cent |
|---|---|---|---|---|---|
| I | A | 958 | 2420 | 4050 | 670 |
| II | A | 712 | 2000 | 3420 | 680 |
| III | A | 948 | 2440 | 4125 | 675 |
| IV | A | 910 | 2500 | 4150 | 675 |

60 Minutes

|  |  | 300% | 500% | Final tensile lbs. per sq. in. | Final elongation in per cent |
|---|---|---|---|---|---|
| I | A | 1105 | 2830 | 4050 | 640 |
| II | A | 985 | 2660 | 4150 | 660 |
| III | A | 1135 | 2880 | 4175 | 635 |
| IV | A | 1120 | 2930 | 4280 | 625 |

Similar vulcanizing experiments were carried out with compositions containing other nitroso-amines, including both like and unlike substituent groups, and hydrocarbon radicals of both the aliphatic and aromatic series, as indicated in the above list in connection with the scorching test.

The experimental results are presented in the following tables:

Table III

|  | A | B | C | D |
|---|---|---|---|---|
| Smoked sheets | 100 | 100 | 100 | 100 |
| Carbon black | 40 | 40 | 40 | 40 |
| Mineral rubber | 5 | 5 | 5 | 5 |
| Zinc oxide | 5 | 5 | 5 | 5 |
| Sulphur | 3 | 3 | 3 | 3 |
| Stearic acid | 3 | 3 | 3 | 3 |
| Mercapto benzo thiazole | 0.8 | 0.8 | 0.8 | 0.8 |
| Phenyl beta naphthyl nitroso-amine | 0 | 0.75 | 0 | 0 |
| Benzyl phenyl nitroso-amine | 0 | 0 | 0.75 | 0 |
| Carbazol nitroso-amine | 0 | 0 | 0 | 0.75 |

| Stock | Cure Min. | Cure Pounds pressure | 300% | 500% | Final tensile lbs. per sq. in. | Final elongation in per cent |
|---|---|---|---|---|---|---|
| A | 60 | 20 | 740 | 2010 | 3335 | 660 |
| B | 60 | 20 | 737 | 2110 | 3535 | 665 |
| C | 60 | 20 | 821 | 2200 | 3720 | 670 |
| D | 60 | 20 | 700 | 2020 | 3450 | 680 |
| A | 75 | 20 | 843 | 2250 | 3660 | 670 |
| B | 75 | 20 | 880 | 2390 | 3910 | 665 |
| C | 75 | 20 | 985 | 2600 | 4260 | 705 |
| D | 75 | 20 | 850 | 2280 | 3700 | 660 |
| A | 90 | 20 | 930 | 2460 | 3890 | 660 |
| B | 90 | 20 | 990 | 2600 | 3950 | 630 |
| C | 90 | 20 | 1068 | 2720 | 4110 | 640 |
| D | 90 | 20 | 960 | 2580 | 3950 | 650 |

Table IV

|  | A | B | C | D |
|---|---|---|---|---|
| Smoked sheets | 100 | 100 | 100 | 100 |
| Carbon black | 40 | 40 | 40 | 40 |
| Mineral rubber | 5 | 5 | 5 | 5 |
| Zinc oxide | 5 | 5 | 5 | 5 |
| Sulphur | 3 | 3 | 3 | 3 |
| Stearic acid | 3 | 3 | 3 | 3 |
| Mercapto benzo thiazole | 0.8 | 0.8 | 0.8 | 0.8 |
| Dibeta naphthyl nitroso-amine | 0 | 0.75 | 0 | 0 |
| Phenyl beta. naphthyl nitroso-amine | 0 | 0 | 0.75 | 0 |
| Phenyl alpha naphthyl nitroso-amine | 0 | 0 | 0 | 0.75 |

| Stock | Cure Min. | Cure Pounds pressure | 300% | 500% | Final tensile lbs. per sq. in. | Final elongation in per cent |
|---|---|---|---|---|---|---|
| A | 60 | 20 | 696 | 1965 | 3590 | 710 |
| B | 60 | 20 | 830 | 2240 | 4000 | 700 |
| C | 60 | 20 | 762 | 2100 | 3700 | 700 |
| D | 60 | 20 | 667 | 1905 | 3200 | 655 |
| A | 75 | 20 | 850 | 2200 | 3890 | 700 |
| B | 75 | 20 | 867 | 2360 | 3850 | 650 |
| C | 75 | 20 | 900 | 2365 | 3840 | 665 |
| D | 75 | 20 | 840 | 2320 | 3760 | 655 |
| A | 90 | 20 | 940 | 2430 | 4000 | 675 |
| B | 90 | 20 | 985 | 2650 | 4075 | 655 |
| C | 90 | 20 | 985 | 2600 | 4000 | 655 |
| D | 90 | 20 | 970 | 2580 | 4000 | 655 |

Table V

|  | A | B | C | D |
|---|---|---|---|---|
| Smoked sheets | 100 | 100 | 100 | 100 |
| Carbon black | 40 | 40 | 40 | 40 |
| Mineral rubber | 5 | 5 | 5 | 5 |
| Zinc oxide | 5 | 5 | 5 | 5 |
| Sulphur | 3 | 3 | 3 | 3 |
| Stearic acid | 3 | 3 | 3 | 3 |
| Mercapto benzo thiazole | 0.8 | 0.8 | 0.8 | 0.8 |
| Diethyl nitroso-amine | 0 | 0.75 | 0 | 0 |
| Piperidine nitroso-amine | 0 | 0 | 0.75 | 0 |
| Methyl phenyl nitroso-amide | 0 | 0 | 0 | 0.75 |

Table V—Continued

| Stock | Cure | | 300% | 500% | Final tensile lbs. per sq. in. | Final elongation in per cent |
|---|---|---|---|---|---|---|
| | Min. | Pounds pressure | | | | |
| A | 60 | 20 | 675 | 1870 | 3350 | 690 |
| B | 60 | 20 | 715 | 1955 | 3475 | 675 |
| C | 60 | 20 | 820 | 2200 | 3780 | 680 |
| D | 60 | 20 | 712 | 2020 | 3370 | 665 |
| A | 75 | 20 | 780 | 2120 | 3630 | 680 |
| B | 75 | 20 | 895 | 2430 | 3860 | 655 |
| C | 75 | 20 | 1055 | 2820 | 4220 | 640 |
| D | 75 | 20 | 960 | 2490 | 3940 | 655 |
| A | 90 | 20 | 922 | 2440 | 3970 | 670 |
| B | 90 | 20 | 982 | 2610 | 3910 | 640 |
| C | 90 | 20 | 1168 | 2900 | 4160 | 630 |
| D | 90 | 20 | 1120 | 2825 | 4120 | 630 |

Table VI

| | A | B | C | D |
|---|---|---|---|---|
| Smoked sheets | 100 | 100 | 100 | 100 |
| Carbon black | 40 | 40 | 40 | 40 |
| Mineral rubber | 5 | 5 | 5 | 5 |
| Zinc oxide | 5 | 5 | 5 | 5 |
| Sulphur | 3 | 3 | 3 | 3 |
| Stearic acid | 3 | 3 | 3 | 3 |
| Mercapto benzo thiazole | 0.8 | 0.8 | 0.8 | 0.8 |
| Dialpha naphthyl nitroso-amine | 0 | 0.75 | 0 | 0 |
| Phenyl tolyl nitroso-amine | 0 | 0 | 0.75 | 0 |
| Ditolyl nitroso-amine | 0 | 0 | 0 | 0.75 |

| Stock | Cure | | 300% | 500% | Final tensile lbs. per sq. in. | Final elongation in per cent |
|---|---|---|---|---|---|---|
| | Min. | Pounds pressure | | | | |
| A | 60 | 20 | 858 | 2250 | 3660 | 660 |
| B | 60 | 20 | 770 | 2120 | 3620 | 680 |
| C | 60 | 20 | 818 | 2170 | 3470 | 660 |
| D | 60 | 20 | 845 | 2160 | 3380 | 660 |
| A | 75 | 20 | 925 | 2400 | 3975 | 665 |
| B | 75 | 20 | 832 | 2360 | 3820 | 660 |
| C | 75 | 20 | 975 | 2420 | 4030 | 670 |
| D | 75 | 20 | 933 | 2430 | 4050 | 680 |
| A | 90 | 20 | 1040 | 2560 | 4120 | 675 |
| B | 90 | 20 | 1050 | 2680 | 4000 | 635 |
| C | 90 | 20 | 1080 | 2720 | 4010 | 645 |
| D | 90 | 20 | 1050 | 2670 | 3820 | 625 |

From the data thus obtained it is to be observed that, not only are the rubber compounds prepared with an addition of the diphenyl nitroso-amine, for example, free from the tendency toward preliminary vulcanization or scorching, but that when vulcanized at 20 pounds steam pressure and for the periods of time indicated, the vulcanized product exhibits as good or in some instances a superior cure (with respect to intermediate and final elongation values) than the composition to which such addition has not been made.

It is therefore shown that by means of this invention not only may extremely active accelerators, (which have been hitherto unavailable for use in the rubber industry on account of their very high activity) be safely employed in rubber compounds and mixed and milled without initiating premature vulcanization, but the vulcanized rubber product is initially as good or better than rubber similarly compounded and vulcanized but without the addition of an inhibiting reagent.

It is also indicated that whereas diaryl substituted nitroso-amines are especially effective, with respect to the prevention of premature acceleration of vulcanization, the alkyl or dialkyl substituted nitroso-amines may also be used, although somewhat less effective.

Compounds which are in some respects related to the substituted nitroso-amines above defined, and have been thus tested for use in accordance with the invention, include carbazole nitroso-amine which may be spoken of as nitroso N-carbazole,—

Carbazole nitroso-amine or nitroso N-carbazole, however, is not strictly in the same category with the other compounds tested and in fact shows but little retarding effect in the scorching test. The piperidine nitroso-amine likewise does not manifest pronounced retarding effects. The results are given, however, because they are related to the other nitroso-amine compounds. Their failure to be more effective in these respects may be attributed to the valence linkage between the R and R' groups of the nitroso-amine; which will be apparent from the formula of the former compound, as above given.

While the above disclosure relates to a preferred procedure, according to the invention, and to specific reagents employed in specific proportions, it is to be understood that variations may be made in both the mode of carrying out the invention and in the nature and amount of the several reagents used, according to the particular conditions of practice and the characteristics desired in the resulting product, as will be clear to those skilled in the art of treating rubber.

This application is a continuation in part of my application, Serial No. 323,556, filed December 3, 1928, and is designated as Case III—1 of a group of continuation applications filed on even date herewith.

I claim:

1. Method of treating rubber or rubber compositions comprising adding thereto a vulcanizing agent, an organic ultra-accelerator and a di-substituted nitroso-amine containing hydrocarbon radicals as substituents.

2. Method of treating rubber or rubber compositions comprising adding a vulcanizing agent, an organic ultra-accelerator, and a di-substituted nitroso-amine containing hydrocarbon radicals as substituents and thoroughly mixing the same.

3. Method of treating rubber or rubber compositions comprising adding a vulcanizing agent, an organic ultra-accelerator, and a di-substituted nitroso-amine containing hydrocarbon radicals as substituents, mixing the same, and subjecting the mixture to vulcanization.

4. An ingredient for rubber compositions, comprising the reaction product of sulphur-containing organic accelerator and a di-substituted nitroso-amine.

5. Method of vulcanizing rubber or rubber compositions with a vulcanizing agent and a sulphur-containing organic accelerator characterized by controlling the action of the accelerator with a di-substituted nitroso-amine containing hydrocarbon radicals as substituents.

6. Method of vulcanizing rubber or rubber compositions with a vulcanizing agent and an organic accelerator containing a thiazole nucleus, characterized by controlling the action of the accelerator with a di-substituted nitroso-amine containing hydrocarbon radicals as substituents.

7. Method of vulcanizing rubber or rubber compositions with a vulcanizing agent and mercapto benzo thiazole, characterized by controlling the action of the accelerator with a di-substituted nitroso-amine containing hydrocarbon radicals as substituents.

8. Method of vulcanizing rubber or rubber compositions with a vulcanizing agent and an organic accelerator, characterized by controlling the action of the accelerator with a di-substituted nitroso-amine containing aryl and/or alkyl hydrocarbon radicals as substituents.

9. Method of vulcanizing rubber or rubber compositions with a vulcanizing agent and an organic accelerator, characterized by controlling the action of the accelerator with a diaryl substituted nitroso-amine.

10. Method of vulcanizing rubber or rubber compositions with a vulcanizing agent and an organic accelerator, characterized by controlling the action of the accelerator with diphenyl nitroso-amine.

11. Method of vulcanizing rubber or rubber compositions with a vulcanizing agent and a sulphur-containing organic accelerator characterized by controlling the action of the accelerator with a di-substituted nitroso-amine containing aryl and/or alkyl hydrocarbon radicals as substituents.

12. Method of vulcanizing rubber or rubber compositions with a vulcanizing agent and a sulphur-containing organic accelerator, characterized by controlling the action of the accelerator with a diaryl substituted nitroso-amine.

13. Method of vulcanizing rubber or rubber compositions with a vulcanizing agent and a sulphur-containing organic accelerator, characterized by controlling the action of the accelerator with diphenyl nitroso-amine.

14. Method of vulcanizing rubber or rubber compositions with a vulcanizing agent and an organic accelerator containing a thiazole nucleus, characterized by controlling the action of the accelerator with a di-substituted nitroso-amine containing aryl and/or alkyl hydrocarbon radicals as substituents.

15. Method of vulcanizing rubber or rubber compositions with a vulcanizing agent and an organic accelerator containing a thiazole nucleus, characterized by controlling the action of the accelerator with a diaryl substituted nitroso-amine.

16. Method of vulcanizing rubber or rubber compositions with a vulcanizing agent and an organic accelerator containing a thiazole nucleus, characterized by controlling the action of the accelerator with diphenyl nitroso-amine.

17. Method of vulcanizing rubber or rubber compositions with a vulcanizing agent and mercapto benzo thiazole, characterized by controlling the action of the accelerator with a di-substituted nitroso-amine containing aryl and/or alkyl hydrocarbon radicals as substituents.

18. Method of vulcanizing rubber or rubber compositions with a vulcanizing agent and mercapto benzo thiazole, characterized by controlling the action of the accelerator with a diaryl substituted nitroso-amine.

19. Method of vulcanizing rubber or rubber compositions with a vulcanizing agent and mercapto benzo thiazole, characterized by controlling the action of the accelerator with diphenyl nitroso-amine.

20. An accelerator composition comprising an organic accelerator and a di-substituted nitroso-amine containing aryl and/or alkyl hydrocarbon radicals as substituents.

21. An accelerator composition comprising an organic accelerator and a diaryl substituted nitroso-amine.

22. An accelerator composition comprising an organic accelerator and diphenyl nitroso-amine.

23. An accelerator composition comprising a sulphur-containing organic accelerator and a di-substituted nitroso-amine containing aryl and/or alkyl hydrocarbon radicals as substituents.

24. An accelerator composition comprising a sulphur-containing organic accelerator, and a diaryl substituted nitroso-amine.

25. An accelerator composition comprising a sulphur-containing organic accelerator and diphenyl nitroso-amine.

26. An accelerator composition, comprising an accelerator containing a thiazole nucleus, and a di-substituted nitroso-amine containing aryl and/or alkyl hydrocarbon radicals as substituents.

27. An accelerator composition, comprising an accelerator containing a thiazole nucleus, and a diaryl substituted nitroso-amine.

28. An accelerator composition, comprising an accelerator containing a thiazole nucleus, and diphenyl nitroso-amine.

29. An accelerator composition comprising mercapto benzo thiazole, and a di-substituted nitroso-amine containing aryl and/or alkyl hydrocarbon radicals as substituents.

30. An accelerator composition, comprising mercapto benzo thiazole, and a diaryl substituted nitroso-amine.

31. An accelerator composition comprising mercapto benzo thiazole and diphenyl nitroso-amine.

32. An accelerator composition comprising an organic accelerator and a di-substituted nitroso-amine containing hydrocarbon radicals as substituents.

33. An accelerator composition comprising a sulphur-containing organic accelerator and a di-substituted nitroso-amine containing hydrocarbon radicals as substituents.

34. An accelerator composition comprising an accelerator containing a thiazole nucleus and a di-substituted nitroso-amine containing hydrocarbon radicals as substituents.

35. An accelerator composition comprising mercapto benzo thiazole and a di-substituted nitroso-amine containing hydrocarbon radicals as substituents.

Signed by me at Boston, Massachusetts, this 1st day of June, 1929.

HENRY B. MORSE.